(12) United States Patent
Wang et al.

(10) Patent No.: US 9,829,601 B2
(45) Date of Patent: Nov. 28, 2017

(54) METHOD AND DEVICE FOR PATROL INSPECTING AND LOCATING A RADIOACTIVE SUBSTANCE

(71) Applicant: NUCTECH COMPANY LIMITED, Beijing (CN)

(72) Inventors: Qiang Wang, Beijing (CN); Kun Zhao, Beijing (CN); Ming Ruan, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 648 days.

(21) Appl. No.: 14/367,824

(22) PCT Filed: Dec. 20, 2012

(86) PCT No.: PCT/CN2012/087012
§ 371 (c)(1),
(2) Date: Jun. 20, 2014

(87) PCT Pub. No.: WO2013/091552
PCT Pub. Date: Jun. 27, 2013

(65) Prior Publication Data
US 2015/0025841 A1 Jan. 22, 2015

(30) Foreign Application Priority Data

Dec. 23, 2011 (CN) .......................... 2011 1 0439199

(51) Int. Cl.
*G01T 1/00* (2006.01)
*G01V 5/00* (2006.01)
(Continued)

(52) U.S. Cl.
CPC .............. *G01V 5/0008* (2013.01); *G01T 1/00* (2013.01); *G01T 1/169* (2013.01); *G01T 7/00* (2013.01)

(58) Field of Classification Search
USPC ........................................................ 702/150
See application file for complete search history.

(56) References Cited

U.S. PATENT DOCUMENTS

| | | | | | |
|---|---|---|---|---|---|
| 6,054,712 A | * | 4/2000 | Komardin | .............. | A61B 6/483 250/363.06 |
| 7,603,138 B2 | * | 10/2009 | Zhang | .................... | G08B 21/12 340/531 |

(Continued)

FOREIGN PATENT DOCUMENTS

| | | |
|---|---|---|
| CN | 1598553 A | 3/2005 |
| CN | 2690896 Y | 4/2005 |

(Continued)

OTHER PUBLICATIONS

Upp, D.L., and Keyser, R.M. "Performance of a car-mounted neutron and gamma-ray monitoring system for illicit material detection." 45th Annual Meeting of the INMM[online], Jul. 2004 [retrieved on Dec. 6, 2016]. Retrieved from the Internet: <URL: http://www.ortec-online.com/searchresults.aspx?Keywords=illicit>.*

(Continued)

*Primary Examiner* — Paul D Lee
(74) *Attorney, Agent, or Firm* — Baker & Hostetler LLP

(57) ABSTRACT

A method for patrol inspecting and locating a radioactive substance, comprising: providing a background radioactive intensity value of environment; collecting radioactive intensity values from a inspecting region by a detector at a plurality of sampling points on a patrol inspection route; calculating a radioactive intensity distribution in the inspecting region on basis of the collected radioactive intensity values and the background radioactive intensity value; and determining a position of the radioactive substance on basis of the radioactive intensity distribution. Furthermore, a device for patrol inspecting and locating a radioactive sub- (Continued)

stance comprises: two or more detectors configured to collect radioactive intensity values from a inspecting region around a patrol inspection route, at each of a plurality of sampling points on the patrol inspection route; and a movable carrier configured to carry the detector and to move along the patrol inspection route to pass by the sampling points. The method and device can obtain the position and the radioactive intensity distribution of the radioactive substance within the inspecting region on basis of the multiple-point observation on the patrol inspection route.

15 Claims, 3 Drawing Sheets

(51) Int. Cl.
*G01T 7/00* (2006.01)
*G01T 1/169* (2006.01)

(56) References Cited

U.S. PATENT DOCUMENTS

| | | | |
|---|---|---|---|
| 2001/0052572 | A1 | 12/2001 | Mikami et al. |
| 2006/0228806 | A1* | 10/2006 | Sens ............... G01N 17/004 436/164 |
| 2006/0250279 | A1* | 11/2006 | Taniguchi ........... G08G 1/042 340/933 |
| 2007/0034808 | A1* | 2/2007 | Evans .................. G01T 3/00 250/371 |
| 2008/0208520 | A1* | 8/2008 | Noyer ................. G01C 21/26 702/150 |
| 2008/0302967 | A1 | 12/2008 | Klann et al. |
| 2009/0012745 | A1 | 1/2009 | Longman et al. |
| 2011/0204243 | A1* | 8/2011 | Bendahan ............ G01T 1/167 250/367 |

FOREIGN PATENT DOCUMENTS

| | | |
|---|---|---|
| CN | 1318841 C | 5/2007 |
| CN | 101069091 A | 11/2007 |
| CN | 100420937 C | 9/2008 |
| CN | 202522705 U | 11/2012 |
| EP | 2075595 A2 | 7/2009 |
| JP | 11-006875 A | 1/1999 |
| WO | WO 2007/131536 A1 | 11/2007 |

OTHER PUBLICATIONS

European Patent Application No. 12858884.5; Extended Search Report; dated Aug. 3, 2015; 9 pages.

China Application No. 201110439199.4; Office Actions; dated Aug. 28, 2014; 15 pages.

International Patent Application No. PCT/CN2012/087012; International Search Report; dated Mar. 14, 2013; 3 pages.

International Patent Application No. PCT/CN2012/087012; Written Opinion of the International Searching Authority; dated Mar. 14, 2013; 8 pages.

Zhang et al.; Design of γ-Ray Vehicle Patrol System based on GPS; Nuclear Electronics & Detection Technology; vol. 31 No. 4; Apr. 2011; p. 466-469; contains abstract.

* cited by examiner

METHOD AND DEVICE FOR PATROL INSPECTING AND LOCATING A RADIOACTIVE SUBSTANCE

CROSS-REFERENCE TO RELATED APPLICATIONS

This application is the National Stage of International Application No. PCT/CN2012/087012, filed Dec. 20, 2012, entitled "Method and Device For Inspecting and Positioning Radioactive Substance," which claims the benefit of Chinese Patent Application No. 201110439199.4 filed on Dec. 23, 2011, entitled "method and device for patrol inspection and locating a radioactive substance," the disclosures of which are incorporated herein by reference in their entireties.

BACKGROUND OF THE INVENTION

1. Field of the Invention

The present invention generally relates to a method for patrol inspecting and locating a radioactive substance and a device for carrying out the method.

2. Description of the Related Art

In an application for such as environmental protection or security, when a radioactive substance is monitored and administrated, it typically needs to measure radioactive distribution within a certain region or to seek a lost radioactive source. A movable patrol spectrometer is a device for detecting the radioactive substance with a positioning system thereon, which may be mounted on a motor vehicle, a helicopter, a ship or other carriers. The positioning system may acquire current geographic positions and gamma spectrometry or neutron count rate of the radioactive substance in real time. The movable patrol spectrometer comprises GPS positioning system besides components typically comprised in a conventional spectrometer, for example, a detector, a power supply, a preamplifier, an electronic module, a MCA (Multichannel Analyzer) and data processing unit. In addition, the movable patrol spectrometer focuses on acquiring, saving, reading and analysis of numerous sampled data in a high efficiency. By means of the conventional movable spectrometer, the radioactive level in a travel route may be measured, but the radioactive distribution in the local region in which the route is located may not be attained. For example, when a vehicle-mounted patrol spectrometer carries out inspection along a road, it can only mark out the radioactive levels at respective points on the road, but it fails to get specific conditions of the radioactive distribution within a certain range on both sides of the road. If it is used to seek a lost radioactive source, then it is impossible to determine the specific position of the radioactive source.

Some special devices for determining the position of the radioactive source are also proposed. One class of them carry out locating by imaging, for example by a gamma camera. Another class of them have collimators and rotating units. By means of the collimators, a direction in which radioactive source is located may be determined and the position of the radioactive source may be determined by measurements of a plurality of positions. However, as all of these devices need to measure fixed points for a long time and have a low detection efficiency, they are not suitable to the patrol inspection. They may only be used to carry out further measurements after the patrol spectrometer has determined suspicious regions.

In view of this, there indeed is a need to provide a patrol inspection device and a patrol inspection method for rapidly and efficiently measuring radioactive intensity distribution in a detection region around the patrol inspection route and determining the positions of the radioactive substances.

SUMMARY OF THE INVENTION

An object of the present invention is to provide a patrol inspection device and a patrol inspection method which can determine a position and the radioactive intensity distribution of the radioactive substances in the inspecting region on basis of multiple-point observation of the detectors on the patrol inspection route.

To this end, the present invention may be implemented by the following.

In accordance with one aspect of the present invention, it provides a method for patrol inspecting and locating a radioactive substance, comprising:

(a) providing a background radioactive intensity value of environment;

(b) collecting radioactive intensity values from a inspecting region by a detector at a plurality of sampling points on a patrol inspection route;

(c) calculating a radioactive intensity distribution in the inspecting region on basis of the collected radioactive intensity values and the background radioactive intensity value; and (d) determining a position of the radioactive substance on basis of the radioactive intensity distribution.

Preferably, the method further may comprise a step (b1) between the step (b) and the step (c):

determining whether the differences between the collected radioactive intensity values and the background radioactive intensity values are greater than a collecting threshold, and carrying out the step (c) if they are greater than the collecting threshold; otherwise, if they are not greater than the collecting threshold, updating the background radioactive intensity values by a weighted average of the collected radioactive intensity values and the background radioactive intensity values and returning to the step (b) to recollect the radioactive intensity values.

Preferably, the method may further comprise a step (b2) between the step (b) and the step (c):

determining whether there is a data segment, in which the radioactive intensity values drop abruptly and then increase abruptly, in the sequence of the radioactive intensity values collected at multiple continuous sampling points, and deleting the data segment to eliminate effects of barriers if it is present.

Preferably, the detector may comprise at least two detectors facing towards the inspecting regions in different directions respectively, the detectors being separated by a shielding part from each other.

Further, the radioactive intensity values may be represented by counting rate or dose rate.

Further, the step (c) may comprise a step (c1):

dividing the inspecting region into a plurality of subregions, providing the detection efficiencies of the detector to the subregions and determining the radioactive intensity of each subregion on basis of the background radioactive intensity and the detection efficiencies.

Further, the number of the subregions may not be greater than the number of the sampling points.

Further, the detection efficiencies may be calibrated for a certain energy range and/or species of the radioactive substance.

Further, the step (c) further may comprise a step (c2):

drawing a map of radioactive intensity distribution in the Inspecting region on basis of the radioactive intensity in each subregion.

Further, the division of the subregions may be carried out in one dimension, two dimensions or three dimensions.

Further, the detector may be provided on a movable carrier, the collected radioactive intensity value is $$c_t = b_t + \sum_m a_m \Phi(p_m, q_t, \theta_t) + \varepsilon_t,$$

wherein m is the index of the subregions, m=1, ..., M, M is the total number of the subregions, $b_t$ is the background radioactive intensity value, $p_m$ is the position of the mth subregion, $a_m$ is the radioactive intensity value of the mth subregion, $q_t$ is a position of the movable carrier, $\theta_t$ is a directional angle of the movable carrier, $\phi(p_m, q_t, \theta_t)$ is the detection efficiency of the detector to the position $p_m$ if the movable carrier is located in the position $q_t$ with the directional angle of $\theta_t$, t is the index of the collected radioactive intensity values, t=1, ..., N, N is the total number of the collected radioactive intensity values, $\varepsilon_t$ is an collecting error.

In a further embodiment, the step (c1) may be performed by sparse decomposition of a vector C on a vector set D, in which the vector $C=(c_1-b_1, \ldots, c_N-b_N)^T$, the vector set $D=\{D_m\}$, $D_m=(\phi(p_m, q_1, \theta_1), \ldots, \phi(p_m, q_N, \theta_N))^T$.

In a further embodiment, the step of determining the radioactive intensity of each subregion may further comprise:

(c11) defining a set S of indexes and a residual vector R and setting an initial value $S_0$ of the set S as an empty set, an initial value $R_0$ of the residual vector R as vector C, and an initial value of $a_m$ as zero;

(c12) defining a projection of the $R_0$ on the vector Dm in the vector set D as $P_m$, defining the value of m corresponding to the maximum of Pm as n, then adding n into $S_0$ to update the set S and updating the residual vector R such that the updated residual vector R is a difference between the vector C and the projection of the vector C on the vector $D_n$;

(c13) determining whether the norm of the updated residual vector R is less than a residual threshold, and if the norm is less than the residual threshold, $a_m$ will be calculated as the projection coefficient of the vector C on the vector $D_m$, in which only if m falls within the updated set S, the calculation result of $a_m$ is nonzero while if m falls out of the updated set S, the calculation result of $a_m$ is zero; otherwise, if the norm of the updated residual vector R is not less than the residual threshold, the $R_0$ and $S_0$ will be replaced by the updated residual vector R and the updated set S respectively to perform the step (c12) again, so as to update the residual vector R and the set S repeatedly until the norm of the updated residual vector R is less than the residual threshold or a cycle number of performing the step (c12) repeatedly meets a predetermined value.

In a further embodiment, the step (d) may comprise the step:

(d1) determining the subregion in which the calculation result of $a_m$ is nonzero as an active subregion and determining the subregion in which the radioactive substance is located on basis of the distribution of the active subregion and the calculation result of $a_m$.

In a further embodiment, the step (d1) may comprise:

numerically solving a position of the active subregion when an error function has its minimum value, the error function being $$H = \sum_t \left(c_t - b_t - \sum_l a_l \Phi(p_l, q_t, \theta_t)\right)^2,$$

wherein $l=x_1, \ldots, x_L$, L is the total number of the active subregion, $x_1, \ldots, x_L$ are indexes of the subregion which is the active subregion, and $p_t$ will be a more accurate position when the error function H meets its minimum value.

In accordance with another aspect of the present invention, it also provides a device for patrol inspecting and locating a radioactive substance and for carrying out the method according to any one of the above embodiments, the device comprising:

two or more detectors, configured to collect radioactive intensity values from a inspecting region around a patrol inspection route, at each of a plurality of sampling points on the patrol inspection route; and a movable carrier, configured to carry the detector and to move along the patrol inspection route to pass by the sampling points, wherein the detectors face towards different directions around the sampling points respectively and are separated by a shielding part from each other.

The at least one aspects of the above technical solutions of the present disclosure can estimate the position and distribution of the radioactive substance by multiple-point observation on the patrol inspection route on basis of the difference of the detection efficiency of the detector in different directions and distances. They provide a rapid and effective approach in particular for dynamical patrol inspection of the radioactive substance.

DETAILED DESCRIPTION OF THE EMBODIMENTS

Figure 1:
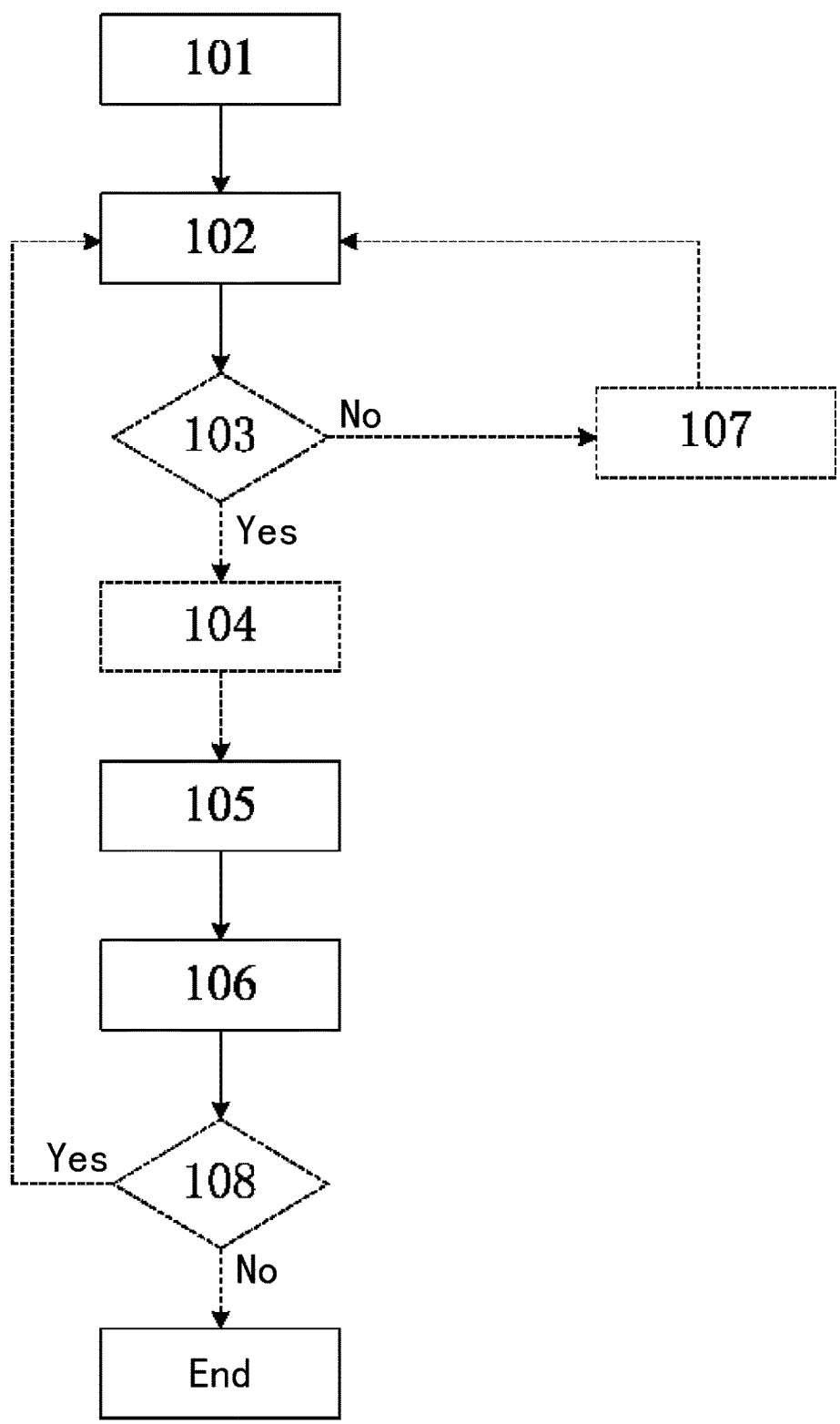
FIG. 1 shows schematically a flowchart of a method for patrol inspecting and locating a radioactive substance according to an embodiment of the present invention.

Technical solutions of the present invention will be described hereinafter in more detail by the way of embodiment with reference to figures of the attached drawings, wherein the same or like reference numerals refer to the same or like elements throughout the specification. The explanation to the embodiment of the present invention with referring to the accompanying drawings is intended to interpret the general inventive concept of the present invention, rather than being construed as a limit to the present invention.

FIG. 1 shows schematically a method for patrol inspecting and locating a radioactive substance according to an embodiment of the present invention. The method comprises: a step 101 of providing a background radioactive intensity value of the environment, a step 102 of collecting radioactive intensity values from a inspecting region by a detector at a plurality of sampling points on a patrol inspection route, a step 105 of calculating a radioactive intensity distribution in the inspecting region on basis of the collected radioactive intensity values, and a step 106 of determining a position of the radioactive substance on basis of the radioactive intensity distribution. The steps indicated by dash lines in FIG. 1 are optional.

In practice, even if no radioactive substances are present in the environment, the detector will show a certain detection signal value, i.e., a background value. Before detecting, it is needed at first to provide a background radioactive intensity value. There is a difference between the samplings without and with a radioactive substance, that is, without the radioactive substance, the background value does not vary significantly if it is measured along various directions; in contrast, with the radioactive substance, the measurements for the radioactive substance vary significantly on different directions if the detector has different detection efficiencies in directions, because the distribution of the radioactive substance is typically uneven. On basis of such characteristic, it is possible to determine whether an initial background value collected is valid or not. Another approach is to collect several background values at different positions. If the differences among these background values are relatively small, it means that the possibility that there is the radioactive substance is little, and thus, the collected background values may be used as the initial background value. Also, it may be determined by experiences and measuring data in the past whether the initial background value is valid or not.

In an embodiment of the present invention, a plurality of sampling points may be provided on the patrol inspection route. After the background radioactive intensity value of the environment is provided, the radioactive intensity values from the inspecting region are collected by the detector at the plurality of sampling points. During the patrol inspection, the collection may be performed successively at a certain interval.

Figure 2:
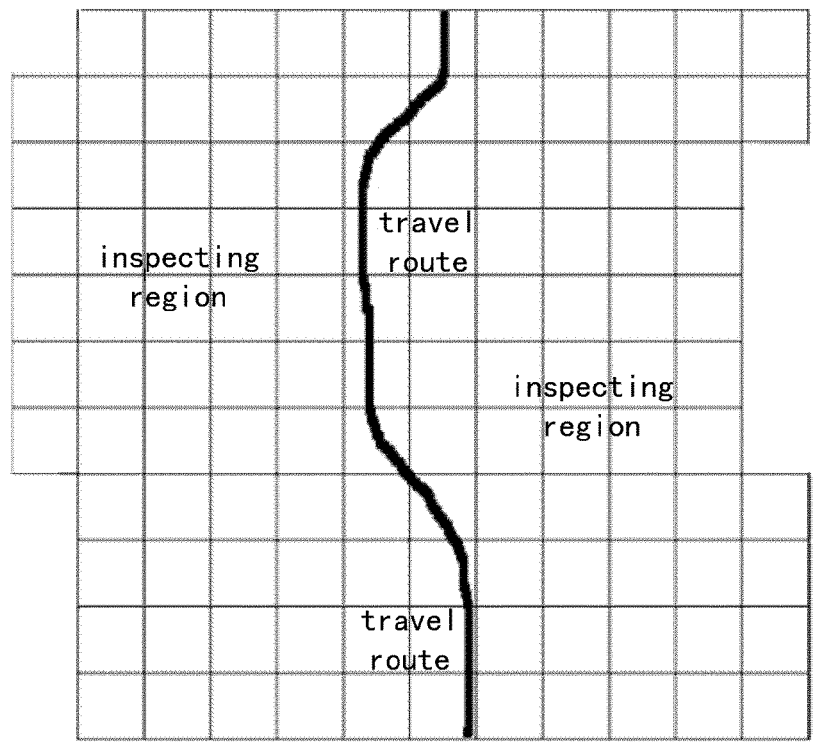
FIG. 2 shows a schematic view of a patrol inspection route and a inspecting region of a device for patrol inspecting and locating the radioactive substance according to an embodiment of the present invention.

The radioactive intensity distribution of the inspecting region is calculated on basis of the collected radioactive intensity values and the background radioactive intensity value. In the step 105, the inspecting region may be divided into a plurality of subregions, the detection efficiencies of the detector to respective data sampling points of the subregions are provided and the radioactive intensity of each subregion can be determined on basis of the background radioactive intensity and the detection efficiencies. The division of the subregions may be carried out in one dimension, two dimensions or three dimensions. That is, each subregion may be constructed as a line segment in one dimension, a plane region in two dimensions or a spatial body in three dimensions. FIG. 2 shows an example in which the inspecting region in a two dimensional plane is divided into respective subregions with squared shape. Seen from FIG. 2, the inspecting region covers a large area on the patrol inspection route (i.e., a travel route of a movable carrier for the detector) and on both sides thereof.

The detection efficiency is the ratio of the number of the detected radiation particles to the number of the particles emitted from the radiation source. The detection efficiency is an inherent property of the device for patrol inspecting the radioactive substance, however, it depends on a measure angle, a distance, even the energy range of the radioactive substance and the type of the radioactive source. Thus, before the radioactive intensity distribution of the radioactive substance is detected or calculated, it is needed to calibrate or calculate out the detection efficiency, for example, it may derive the detection efficiency by practical measurement, simulated calculation or the combination of them.

The number of the subregions is associated with the resolution of the inspecting region and limited by the sampling rate of the detector and the moving speed of the movable carrier for the detector. For example, the number of the subregions may be defined so that it is not greater than the number of the sampling points.

It is assumed that there are M subregions in total, and the index of the subregions is indicated by m, m=1, ..., M. The radioactive intensity value of the mth subregion is indicated by $a_m$, the position of the mth subregion is indicated by $p_m$. The radioactive intensity value collected by the detector in fact is a weighted sum of the radioactive intensities of the respective subregions. It is assumed that the detector collects N radioactive intensity values in total and the indexes of the collected radioactive intensity values are indicated by t, t=1, ..., N and the background radioactive intensity value is indicated by $b_t$. It is assumed that the detector is arranged on the movable carrier, the position in which the movable carrier is located is indicated by $q_t$, the directional angle of the movable carrier is indicated by $\theta_t$. $\phi(p_m, q_t, \theta_t)$ is defined as the detection efficiency of the detector to the position $p_m$ when the movable carrier is located in the position $q_t$ with the directional angle of $\theta_t$. Then the collected radioactive intensity value may be written as $$c_t = b_t + \sum_m a_m \Phi(p_m, q_t, \theta_t) + \varepsilon_t, \qquad (1)$$
$$t = 1, \ldots, N$$

wherein $\varepsilon_t$ is a collecting error. As described above, the detection efficiency $\phi(p_m, q_t, \theta_t)$ in the equation (1) may be derived by for example calibration in advance or interpolation calculation, thus it is known in the calculation.

It can be seen from the equation (1) that the calculation of the radioactive intensity of each subregion is essential to solve the value of $a_m$ for the respective subregions. In case that the detector works normally, the collecting error $\varepsilon_t$ is relatively small. Thus, the calculation of $a_m$ in fact becomes the problem of solving a set of linear equations. However, solutions of $a_m$ are typically not unique if no additional constraints are added. Considering the actual circumstance of patrol inspecting radioactive substance, the number of sources of the radioactive substance is typically not too large and the positions thereof are concentrated relatively. Thus, the constraint of "the number of the subregions that contain radioactive substance is minimum" is added upon solving the equation (1). The phrase of "the subregions that contain radioactive substance" is those in which the value of $a_m$ is greater than zero or a certain threshold. Such subregions may be called as active subregions. Thus, the problem becomes to find the solutions of $a_m$, with maximum number of zeros in the solution, of the set of equations represented by equation (1). In case that the number of measure points is limited, such assumption is helpful to find several subregions with the highest radioactive intensity.

There are many approaches to solve the equation (1) on basis of the above constraints. However, considering that the method and device for patrol inspecting and locating radioactive substance in accordance with the present invention often need to process in real-time, it is preferred to carry out calculation by a method with relative low complexity. For example, the equation (1) may be solved by sparse decomposition of a vector. Giving a vector $C=(c_1-b_1, \ldots, c_N-b_N)^T$, a vector set $D=\{D_m\}$, $D_m=(\phi(p_m, q_1, \theta_1), \ldots, (p_m, q_N, \theta_N))^T$, the solution of $a_m$ may be found by the sparse decomposition of the vector C on the vector set D.

As such, there are also many approaches for sparse decompositions of the vector, for example, the method of Matching Pursuit. In the following embodiments, only an example is provided, but the embodiments of the present invention will not be limited to this.

In the embodiment, at first, a set S of indexes and a residual vector R are defined and the initial value $S_0$ of the set S of indexes is set as an empty set. The initial value $R_0$ of the residual vector R is set as a vector C and the initial value of $a_m$ is set as zero.

Then, a projection of the $R_0$ on the vector Dm in the vector set D is defined as $P_m$, the value of m corresponding to the maximum of Pm is defined as n, then n is added into $S_0$ to update the set S and the residual vector R is updated such that the updated residual vector R is a difference between the vector C and the projection of the vector C on the vector $D_n$. After such step, the number of elements in the set S is increased from zero to 1.

Next, it is possible to determine whether the norm of the updated residual vector R is less than a residual threshold, and if the norm is less than a residual threshold, $a_m$ will be calculated as the projection coefficient of the vector C on the vector $D_m$. In this case, only if m falls within the updated set S, the calculation result of $a_m$ is nonzero; while if m falls out of the updated set S, the calculation result of $a_m$ is zero. Otherwise, if the norm of the updated residual vector R is not less than the residual threshold, the $R_0$ and $S_0$ will be replaced by the updated so residual vector R and the updated set S respectively to perform the previous step again, in order to update the residual vector R and the set S repeatedly until the norm of the updated residual vector R is less than the residual threshold. The residual threshold may be assigned as required. The larger the residual threshold is, the smaller the cycle number of performing the operation is and the smaller the number of nonzero values in the solution of $a_m$ is. In contrast, the smaller the residual threshold is, the larger the cycle number of performing the operation is and the larger the number of nonzero values in the solution of $a_m$ is. However, the solution may become unstable if the residual threshold is too small. It may give the predetermined value of the cycle number, and the calculation will end up if the cycle number of performing cycle operation of updating the residual vector R and the set S repeatedly meets the predetermined value.

Through the above calculation, it is assumed that the resultant set S comprises L elements indicated by $x_1, \ldots, x_L$, it means that the value of $a_m$ in the set $\{a_m\}$ will be nonzero only if $m=x_1, \ldots, x_L$. To this end, the subregion in which the value of $a_m$ is nonzero may be determined as an active subregion. Certainly, it may also provide a threshold larger than zero for the value of $a_m$, and only the subregion in which the value of $a_m$ is larger than the threshold is determined as the active subregion. In the above step 106, the subregion in which the radioactive substance is located may be determined by drawing a map of radioactive intensity distribution in the inspecting region on basis of the calculated radioactive intensity value $a_m$ in each subregion.

In the step 106, after the radioactive intensity value $a_m$ in the subregion is derived by the sparse decomposition of a vector, the accurate position in which the radioactive substance is located may further be calculated, in particular it is true when the number of the active subregions is small and the radioactive substance patrol inspected is a point radioactive source. The calculation may be carried out numerically. An error function is written as $$H = \sum_t \left(c_t - b_t - \sum_l a_l \Phi(p_l, q_t, \theta_t)\right)^2, \qquad (2)$$

$$l = x_1, \ldots, x_L; t = 1, \ldots, N$$

wherein L is the total number of the active subregions, $x_1, \ldots, x_L$ are the indexes of all the subregions which are the active subregions, $t=1, \ldots N$ is the index of the collected radioactive intensity value, and $p_l$ solved numerically when the error function H meets its minimum value will be a more accurate position of the radioactive substance. It should be noted that, during solving the equation (2), not only $p_l$ is an unknown quality, but also the radioactive intensity value $a_l$ of the active subregion is regarded as an unknown quality to be processed. Therefore, the equation $$c_t = b_t + \sum_l a_l \Phi(p_l, q_t, \theta_t) + \varepsilon_t$$

is not a linear equation any longer.

During solving the equation by the sparse decomposition of the vector, the vectors in the vector set $D=\{D_m\}$ have relatively large effects on solving the equation (1). The more the difference among $D_m$ is, i.e., the less their correlation is, the less the ill-condition of the equation set indicated by the equation (1) is and the less the error of the obtained result is and the better the stability is. Considering $D_m=(\phi(p_m, q_1, \theta_1), \ldots, \phi(p_m, q_N, \theta_N))^T$, which represents the detection efficiency of the detector to the same subregion (the same position) at each sampling point. Therefore, the more the difference of the detection efficiencies of the detector in the respective directions is, the less the correlation among $D_m$ is and the less the ill-condition of the equation set indicated by the equation (1) is.

Figure 4:
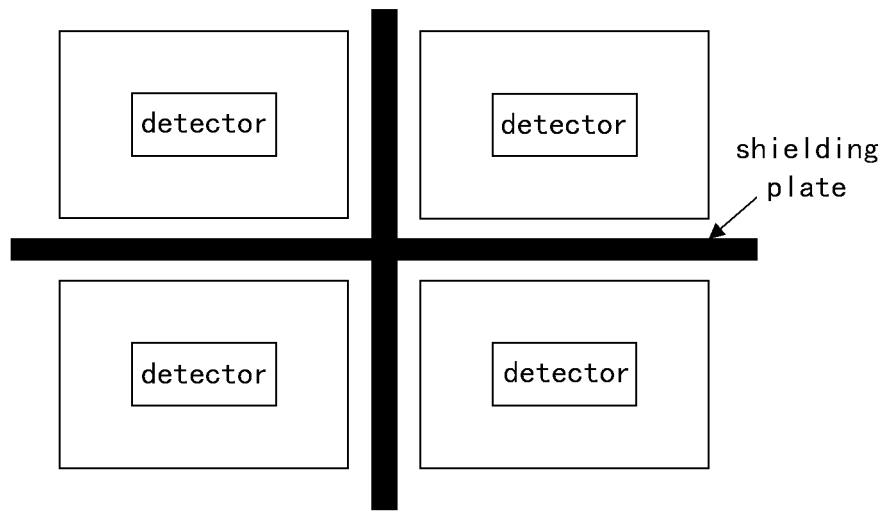
FIG. 4 shows a schematic view of the device for patrol inspecting and locating the radioactive substance with four detectors according to an embodiment of the present invention.
Figure 5:
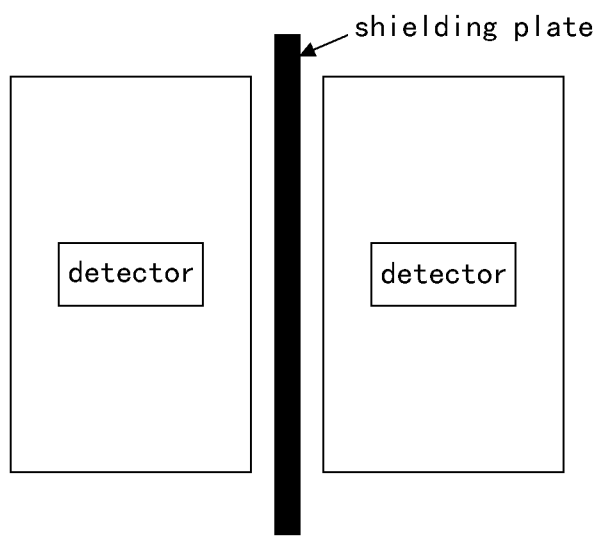
FIG. 5 shows a schematic view of the device for patrol inspecting and locating the radioactive substance with two detectors according to an embodiment of the present invention.

In order to increase the difference of the detection efficiencies of the detector in the respective directions without reducing the overall detection efficiency significantly, a plurality of detectors may be mounted with shielding materials between the detectors, as shown in FIGS. 4-5. For example, the detector may include two, three, four or more detectors facing different directions around the sampling point. In the embodiments of the present invention, the detector may be a NaI detector, a neutron detector or other detectors.

In some embodiments, it may need to position different energy ranges or a certain radioactive substance of interest, and the detection efficiencies of the detector for different energies or radioactive substances are different. In such case, the detection efficiencies may be calibrated for a certain energy range and/or the species of the radioactive substances. It may estimate more accurately the distribution of radioactive substances with different energies or a certain radioactive substance of interest in the inspecting region or the position of the radioactive source.

As shown in FIG. 1, the method may further comprise two optional steps 103, 104 between the step 102 and the step 105. In the step 103, it is determined whether the differences between the collected radioactive intensity values and the background radioactive intensity values are greater than a collecting threshold, and if they are greater than the collecting threshold, it indicates that the apparent radioactive substance is present in the inspecting region and its position and the distribution of intensity needs to be calculated and thus the step 105 or 104 will be carried out next. Otherwise, if they are not greater than the collecting threshold, it indicates that there are no apparent radioactive substances in the inspecting region and the process moves to the step 107. In the step 107, the background radioactive intensity value is updated by a weighted average of the collected radioactive intensity values and the background radioactive intensity value. The background radioactive intensity provided initially in the step 101 is replaced by the updated background radioactive intensity value and the process returns to the step 102 to recollect the radioactive intensity values. The skilled person in the art can set a suitable sampling threshold depending on factors such as a type, intensity or energy of the radiation to meet the requirement of practical patrol inspection. By updating the background radioactive intensity value continuously, a more accurate background radioactive intensity value near each sampling point may be derived so as to prevent the detection errors caused by the difference of the environmental background radioactivity among different sampling points.

Figure 3:
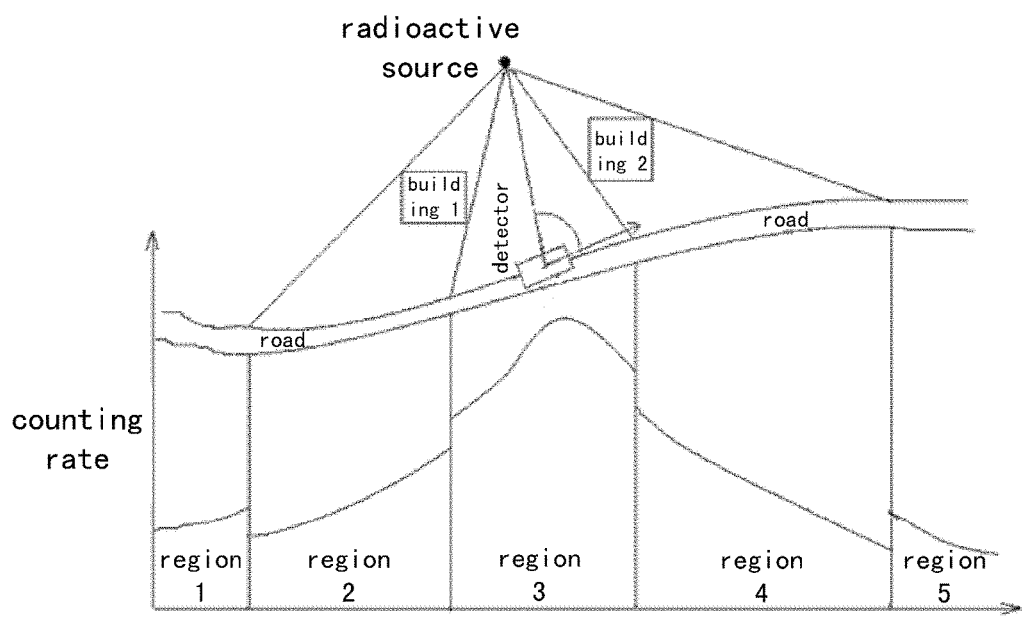
FIG. 3 shows a schematic view of the radioactive intensity distribution collected in the method of the present disclosure for patrol inspecting and locating the radioactive substance.

In some embodiments, the environment around the sampling points may be complicated, for example, there are barriers, such as buildings, hillsides, which are able to attenuate the radioactive intensity significantly. In this circumstance, in order to eliminate the detection errors caused by the shielding of the barriers, the detected data may be pre-processed to remove these data influenced by shielding of the barriers. Thus, an optional step 104 may be provided between the step 102 and the step 105. If the patrol inspection device passes by the region shielded by the barriers, the collected radioactive intensity value may drop abruptly when it enters the shielded region, whereas the collected radioactive intensity value may increase abruptly when it leaves the shielded region. FIG. 3 shows a graph of the radioactive intensity collected by the detector in case that there are the shielding of barriers. In this example, the radioactive intensity is indicated by the counting rate. In FIG. 3, the regions 2 and 4 are those shielded by the barriers, which both exhibit the feature that their radioactive intensities drop abruptly and then increase abruptly in comparison with their adjacent regions. Therefore, in the step 104, it is checked whether there is a data segment, in which the radioactive intensity values drop abruptly and then increase abruptly, in the sequence of the radioactive intensity values collected at multiple continuous sampling points, and thus it is determined whether the detector is shielded by the barriers. If such data segment is present, it will be deleted to eliminate effects of barriers.

The above two optional steps 103 and 104 represented by dashes in FIG. 1 can both be present in one embodiment, and alternatively only any one of them is possible. The order of such two optional steps also may be inversed.

In some embodiments of the present invention, it may need to patrol inspect a plurality of inspecting regions or to determine the distribution of the radioactive substance and to estimate its position repeatedly. In this circumstance, a determining step 108 may be added after the step 106 in FIG. 1. In the step 108, if it needs to repeatedly determine the distribution of the radioactive substance and to estimate its position, the process will return to the step 102 to recollect the detected data, and to continue the following procedures; otherwise, the process will end up. Certainly, it may not provide the step 108 and directly end the whole process after the step 106 has been carried out to determine the position of the radioactive substance.

In the embodiments of the present invention, the radioactive intensity values may be indicated by known parameters in the art for characterizing the radioactive intensity, such as counting rate or dose rate. The features in the above embodiments of the present invention may be combined with each other to form new embodiments, which should be regarded as falling within the scope of the present invention, unless these features are contradicted significantly.

The present invention also relates to a device for patrol inspecting and locating a radioactive substance and for carrying out any of the above exemplified methods, besides the above method for patrol inspecting and locating the radioactive substance. The device comprises detectors and a movable carrier. The detector is configured to collect radioactive intensity values from a inspecting region around a patrol inspection route, at each of a plurality of sampling points on the patrol inspection route. The movable carrier, for example automobile vehicle, is configured to carry the detector and to move along the patrol inspection route to pass by the sampling points. The number of the detectors may be two, three, four or more, and the detectors may face towards different directions around the sampling points respectively and may be separated by a shielding part from each other, for example a shielding plate.

Although the present invention has been explained with reference to the drawings, the embodiments shown in the drawings are only illustrative, instead of limiting the present invention.

Although some embodiments of the general inventive concept are illustrated and explained, it would be appreciated by those skilled in the art that modifications and variations may be made in these embodiments without departing from the principles and spirit of the general inventive concept of the disclosure, the scope of which is defined in the appended claims and their equivalents.

The invention claimed is:

1. A method for patrol inspecting and locating a radioactive substance, comprising:
   (a) providing a background radioactive intensity value of an environment;
   (b) collecting, at a plurality of sampling points on a patrol inspection route, radioactive intensity values from an inspecting region by a detector carried by a movable carrier passing by the plurality of sampling points on the patrol inspection route;
   (c) calculating a radioactive intensity distribution in the inspecting region on a basis of the collected radioactive intensity values and the background radioactive intensity value; and
   (d) determining a position of the radioactive substance on a basis of the radioactive intensity distribution, wherein the method further comprises a step (b2) between the step (b) and the step (c):

determining whether a barrier has had an effect on a radioactive intensity value by determining whether there is a data segment, in which the radioactive intensity values drop abruptly and then increase abruptly, in the sequence of the radioactive intensity values collected at multiple continuous sampling points, and deleting the data segment to eliminate effects of the barrier if it is present.

2. The method for patrol inspecting and locating a radioactive substance according to claim 1, wherein the method further comprises a step (b1) between the step (b) and the step (c):

determining whether the differences between the collected radioactive intensity values and the background radioactive intensity values are greater than a collecting threshold, and carrying out the step (c) if they are greater than the collecting threshold; otherwise, if they are not greater than the collecting threshold, updating the background radioactive intensity values by a weighted average of the collected radioactive intensity values and the background radioactive intensity values and returning to the step (b) to recollect the radioactive intensity values.

3. The method for patrol inspecting and locating a radioactive substance according to claim 1, wherein the detector comprises at least two detectors facing towards the inspecting regions in different directions respectively, the detectors being separated by a shielding part from each other.

4. The method for patrol inspecting and locating a radioactive substance according to claim 1, wherein the radioactive intensity values are represented by counting rate or dose rate.

5. The method for patrol inspecting and locating a radioactive substance according to claim 1, wherein the step (c) comprises a step (c1):

dividing the inspecting region into a plurality of subregions, providing the detection efficiencies of the detector to the subregions and determining the radioactive intensity of each subregion on basis of the background radioactive intensity and the detection efficiencies.

6. The method for patrol inspecting and locating a radioactive substance according to claim 5, wherein the number of the subregions is not greater than the number of the sampling points.

7. The method for patrol inspecting and locating a radioactive substance according to claim 5, wherein the detection efficiencies are calibrated for a certain radiation energy range and/or species of the radioactive substance.

8. The method for patrol inspecting and locating a radioactive substance according to claim 5, wherein the step (c) further comprises a step (c2):

drawing a map of radioactive intensity distribution in the inspecting region on a basis of the radioactive intensity in each subregion.

9. The method for patrol inspecting and locating a radioactive substance according to claim 5, wherein the division of the subregions is carried out in one dimension, two dimensions or three dimensions.

10. The method for patrol inspecting and locating a radioactive substance according to claim 5, wherein the detector is provided on a movable carrier, the collected radioactive intensity value is $$c_t = b_t + \sum_m a_m \Phi(p_m, q_t, \theta_t) + \varepsilon_t,$$

wherein m is the index of the subregions, m=1, ..., M, M is the total number of the subregions, $b_t$ is the background radioactive intensity value, $p_m$ is the position of the mth subregion, $a_m$ is the radioactive intensity value of the mth subregion, $q_t$ is a position of the movable carrier, $\theta_t$ is a directional angle of the movable carrier, $\Phi(p_m, q_t, \theta_t)$ is the detection efficiency of the detector to the position $p_m$ if the movable carrier is located in the position $q_t$ with the directional angle of $\theta_t$, t is the indexes of the collected radioactive intensity values, t=1, ..., N, N is the total number of the collected radioactive intensity values, $\varepsilon_t$ is an collecting error.

11. The method for patrol inspecting and locating a radioactive substance according to claim 10, wherein the step (c1) is performed by sparse decomposition of a vector C on a vector set D, in which the vector $C=(c_1-b_1, \ldots, c_N-b_N)^T$, the vector set $D=\{D_m\}$, $D_m=(\Phi(p_m, q_1, \theta_1), \ldots, \Phi(p_m, q_N, \theta_N))^T$.

12. The method for patrol inspecting and locating a radioactive substance according to claim 11, wherein the step of determining the radioactive intensity of each subregion further comprises:

(c11) defining a set S of indexes and a residual vector R, and setting an initial value $S_0$ of the set S as an empty set, an initial value $R_0$ of the residual vector R as vector C, and an initial value of $a_m$ as zero;

(c12) defining a projection of the $R_0$ on the vector Dm in the vector set D as $P_m$, defining the value of m corresponding to the maximum of Pm as n, then adding n into $S_0$ to update the set S and updating the residual vector R such that the updated residual vector R is a difference between the vector C and the projection of the vector C on the vector $D_n$;

(c13) determining whether the norm of the updated residual vector R is less than a residual threshold, and if the norm is less than the residual threshold, $a_m$ will be calculated as the projection coefficient of the vector C on the vector $D_m$, in which only if m falls within the updated set S, the calculation result of $a_m$ is nonzero, while if m falls out of the updated set S, the calculation result of $a_m$ is zero; otherwise, if the norm of the updated residual vector R is not less than the residual threshold, the $R_0$ and $S_0$ will be replaced by the updated residual vector R and the updated set S respectively to perform the step (c12) again to update the residual vector R and the set S repeatedly until the norm of the updated residual vector R is less than the residual threshold or a cycle number of performing the step (c12) repeatedly meets a predetermined value.

13. The method for patrol inspecting and locating a radioactive substance according to claim 12, wherein the step (d) comprises the step:

(d1) determining the subregion in which the calculation result of $a_m$ is nonzero as an active subregion and determining the subregion in which the radioactive substance is located on a basis of the distribution of the active subregion and the calculation result of $a_m$.

14. The method for patrol inspecting and locating a radioactive substance according to claim 13, wherein the step (d1) comprises:

numerically solving a position of the active subregion when an error function has its minimum value, the error function being $$H = \sum_{t} \left( c_t - b_t - \sum_{l} a_l \Phi(p_l, q_t, \theta_t) \right)^2$$

wherein $l=x_1, \ldots, x_L$, L is the total number of the active subregion, $x_1, \ldots, x_L$ are indexes of the subregion which is the active subregion, and $p_l$ will be a more accurate position when the error function H meets its minimum value.

15. A device for patrol inspecting and locating a radioactive substance and for carrying out the method according to claim 1, the device comprising:
   two or more detectors, configured to collect radioactive intensity values from a inspecting region around a patrol inspection route, at each of a plurality of sampling points on the patrol inspection route; and
   a movable carrier, configured to carry the detector and to move along the patrol inspection route to pass by the sampling points,
   wherein the detectors face towards different directions around the sampling points respectively and are separated by a shielding part from each other.

* * * * *